(No Model.)
G. H. EATON & E. E. BARBER.
CLUTCH.
No. 475,238. Patented May 17, 1892.
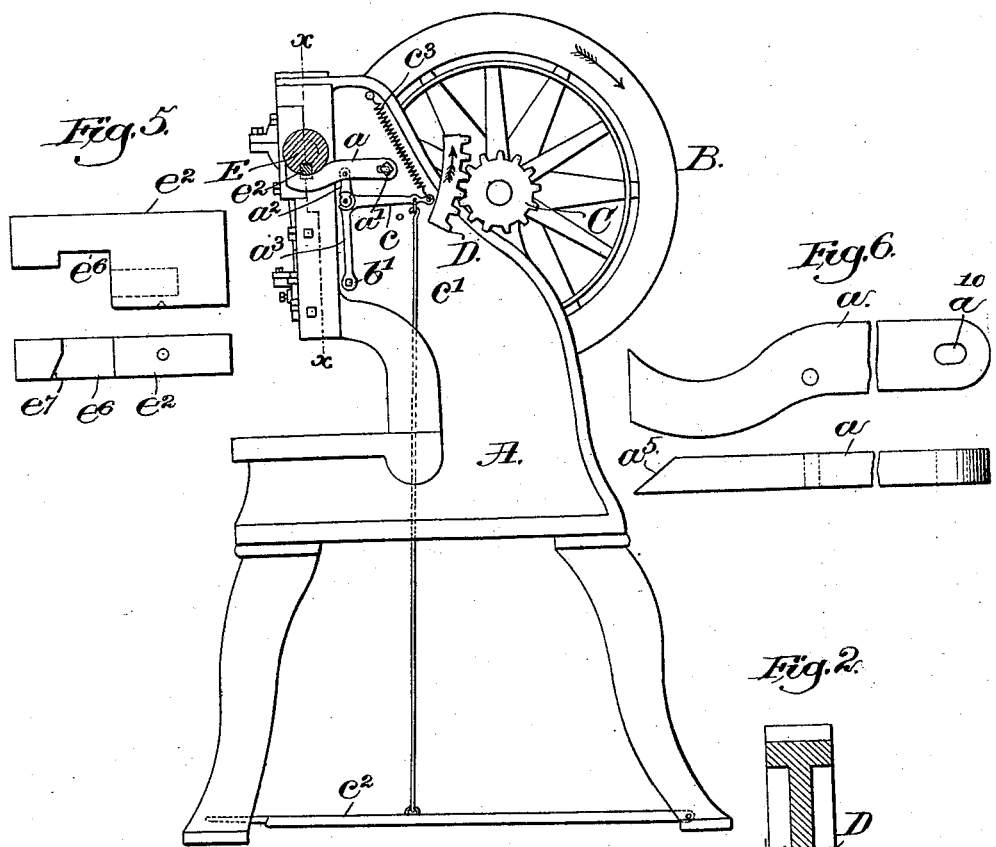
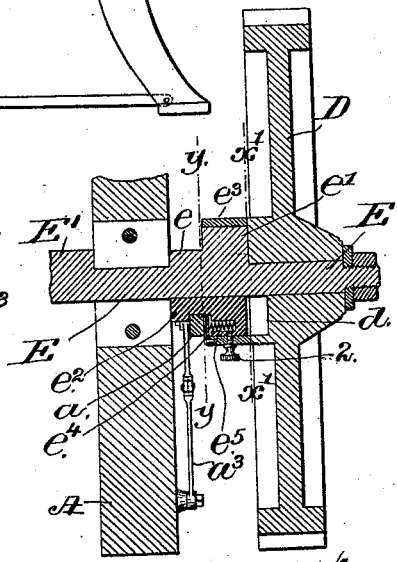
Witnesses:
Edward F. Allen
Louis N. Gowell
Inventors:
George H. Eaton, and
Earl E. Barber,
by Ownsby & Gregory Attys.

UNITED STATES PATENT OFFICE.

GEORGE H. EATON AND EARL E. BARBER, OF BOSTON, MASSACHUSETTS, ASSIGNORS TO GEO. H. EATON & CO., OF SAME PLACE.

CLUTCH.

SPECIFICATION forming part of Letters Patent No. 475,238, dated May 17, 1892.

Application filed January 2, 1892. Serial No. 416,751. (No model.)

*To all whom it may concern:*

Be it known that we, GEORGE H. EATON and EARL E. BARBER, of Boston, county of Suffolk, State of Massachusetts, have invented an Improvement in Clutches, of which the following description, in connection with the accompanying drawings, is a specification, like letters and figures on the drawings representing like parts.
This invention has for its object to provide a novel clutch mechanism especially adapted for use in connection with heavy machinery, such as presses and the like.

In accordance with this invention a continuously-rotating member—such as a driving-wheel or a gear-wheel having one or more recesses in its hub—is arranged loosely upon a shaft. A longitudinally-movable spring-controlled clutch-dog is supported on or by the shaft and adapted to be moved by means of its spring to enter one of the recesses in the rotating member, and thereby connect the shaft with said rotating member. When the parts are so connected, the clutch-dog will be carried around with the shaft and rotating member. A recess with an inclined side wall is formed in said clutch-dog, which is accessible when said dog is in engagement with the rotating member. A bevel-ended latch is arranged on the frame-work in such relation to the clutch-dog that the end of said latch is in line with the recess in said dog when the latter is in engagement with the rotating member, so that as the parts rotate the end of the latch will be caused to enter the said recess in the clutch-dog, and as the beveled end of said latch acts upon the inclined side wall of the recess the dog is withdrawn from its engagement with the rotating member. Heretofore, so far as we are aware, this latch has been connected directly to the treadle-rod and kept in normal elevated position by a spring, and as a consequence said latch is held unsteady, its exact position with relation to the clutch-dog varying. We herein provide a prop or some equivalent device which is adapted to hold the latch firmly in its normal elevated position, and said prop or equivalent latch-support is connected with the treadle-rod. The prop or latch-support is herein represented as a toggle located beneath the latch, it being held straightened by means of a strong spring, and the treadle-rod is connected to one member of said toggle, by means of which said latch may be lowered to release the clutch-dog.

The power required to withdraw the clutch-dog from its engagement with the rotating member is derived from said member, so that as soon as disengagement is effected, if no other means are provided for further moving the said dog, it will remain at rest with its inner end just free from the rotating member; but with heavy machinery the inevitable result in such cases is that the inner end of the dog becomes injured as disengagement is effected, and after considerable use is so injured as to be valueless, and a new clutch-dog must be provided. So, also, the edges of the recess or recesses in the hub of the rotating member become injured when disengagement is effected in substantially the same way that the end of the dog is injured. We have herein provided suitable means—such, for instance, as a strong spring, or it may be any other stored energy—which when released acts to withdraw the clutch-dog still farther, or impart to it a movement in addition to that which can be given to it by means of the rotating member, and the parts are so arranged that the said spring operates as soon as the power exerted by the rotating member becomes less than the power of the spring, so that the withdrawal or outward movement of the dog is continuous or uninterrupted. The clutch-dog when thus withdrawn cannot touch the rotating member, and, furthermore, its end will not become injured, nor will the edges of the recesses in the rotating member become injured as disengagement is effected because of the additional means employed for moving the dog at such times.

Figure 1 shows in side elevation a press provided with a clutch mechanism embodying our invention, the continuously-rotating wheel being broken away to more clearly show the parts for disengaging the clutch. Fig. 2 is a vertical section of the continuously-rotating wheel and shaft and clutch mechanism, taken on an enlarged scale, on the dotted line $x\ x$ shown in Fig. 1; Fig. 3, a cross-section of the parts shown in Fig. 2, taken on the dotted line $y\ y$, looking toward the right; Fig. 4, a section of the parts shown in Fig. 2, taken on the dotted line $x'\ x'$, looking toward the right; Fig. 5, side and edge views, enlarged, of the clutch-dog to be referred to; and Fig. 6, side and edge views, enlarged, of the latch for moving the clutch-dog to be referred to.

The press to which the clutch mechanism forming the subject-matter of this invention is applied is an ordinary one, comprising a main frame-work A, drive-wheel B, pinion C on the drive-wheel shaft, and driving-gear D, mounted loosely on the operating-shaft E and engaged and driven by said pinion C, the said operating-shaft E in practice having a suitable eccentric E′, formed integral with or secured thereto to reciprocate in any usual manner a slide which carries a punch or die. The hub of the driving-gear D has three or more recesses $d$ formed in it, radiating from the center, as best shown in Fig. 4. The shaft E has enlarged portions $e\ e'$ of different diameter, the portion $e'$ being somewhat larger than the portion $e$, yet both portions are preferably formed integral therewith. A recess like unto a splineway is formed in the portion $e$, the said recess registering with any one of the recesses $d$ in the face of the hub of the rotating member D when said member is turned, so that one of the recesses is brought opposite the splineway. A clutch-dog $e^2$ (see Figs. 2 and 5) is contained in this recess or splineway, formed in the portions $e\ e'$. A ring $e^3$ is shrunk or otherwise secured on the portion $e'$ to hold the clutch-dog in place, and a plate $e^4$ is secured to the portion $e'$ to cover the recess and further prevent removal of the clutch-dog.

A spring $e^5$, placed in a suitably-formed socket in the clutch-dog $e^2$ and bearing against the plate $e^4$, acts to force the said clutch-dog in a direction away from the plate or toward the hub of the gear-wheel, so that if said clutch-dog were unrestrained it would be pressed against the face of the hub of the gear-wheel until one of the recesses $d$ was brought into proper position opposite said clutch-dog, at which time the clutch-dog would be forced into the recess.

The under side of the clutch-dog $e^2$ (see Fig. 5) is recessed, as at $e^6$, and one side wall of said recess $e^6$ is inclined or beveled, as at $e^7$.

The latch $a$ has at its rear end a slot $a^{10}$, which receives a pivot $a'$, secured to the main frame-work, so that said latch may be vibrated on said pivot and also be moved longitudinally. The forward end of the latch $a$ is beveled at one side, as at $a^5$. (See Fig. 6.)

As a prop or support for the latch $a$, which holds it in its normal elevated position, we have herein shown a toggle. The link $a^2$ of the toggle is loosely connected to the latch $a$, and the link $a^3$ is pivoted to the frame-work at $b'$, and an arm $c$ extends laterally from one of said links, as $a^3$, for instance, which arm is connected by a treadle-rod $c'$ with a treadle $c^2$. A strong spring $c^3$ is connected at one end to the arm $c$ and at the opposite end to the frame-work and operates to hold the arm $c$ in elevated position in opposition to the action of the treadle, and thereby maintain the toggle in its straightened position, and consequently hold the latch in its elevated position for engagement with the clutch-dog. The spring $c^3$ also acts to throw the latch $a$ toward the left, so that the pivot $a'$ occupies a position at the extreme right-hand end of the slot.

The operation of the machine is as follows: The parts being in the position shown in Fig. 2, the rotating member or gear-wheel D is supposed to be continuously revolving loosely on the shaft E in the direction of the arrow thereon. By depressing the treadle $c^2$ the latch $a$ will be drawn down, thus disengaging the clutch-dog $e^2$, and the latter by means of the spring $e^5$ will be pressed against the face of the hub of the rotating member until one of the recesses therein comes opposite said spring-controlled dog, when the latter will enter and thereby lock the shaft and rotating member together, so that the shaft will be turned by said rotating member. The clutch-dog $e^2$ will consequently be turned with the shaft, which will continue to revolve in the direction of the arrow in Fig. 1 so long as the treadle is held depressed. As soon as the treadle is released the latch $a$ will rise and bear against the portion $e$ of the shaft E until the clutch-dog $e^2$ arrives at the under side of the shaft or in position to engage the beveled end of the latch $a$, at which time the end of the latch enters the recess $e^6$ and the beveled or inclined portion $e^7$, bearing upon the beveled end portion $a^5$, first moves said latch longitudinally until the pivot $a'$ occupies a position at the extreme left-hand end of the slot $a^{10}$, thereby storing up energy in the spring $c^3$ or any other motive power that may be employed in lieu of said spring. As the shaft continues to revolve with the clutch-dog in engagement, as aforesaid, the said dog will continue to be withdrawn from the recess $d$ in the rotating member until the power of said member to further rotate the shaft, and consequently move the clutch-dog against the beveled end of the latch, diminishes, so that the spring or motive power $c^3$ becomes the stronger, at which time said spring will act to move the latch $a$ longitudinally toward the left a short distance, so that the pivot $a'$ will occupy a position at the extreme right-hand end of the slot $a^{10}$, and during such longitudinal movement of the latch the clutch-dog will be farther moved away from the rotating member. This change of motive power for moving the clutch-dog takes place just as the said dog disengages the rotating member, and the change being continuous or without interruption the end of said dog will not become injured by the rotating member, nor will the edges of the recesses in the rotating member become injured by the dog. A set-screw 2 is provided, which may be used to positively lock the clutch-dog $e^2$ in its position to allow the rotating member to rotate freely independently of the shaft, and when so locked the shaft E may be turned at will to adjust the dies.

While we have herein shown the clutch mechanism in connection with a press, we desire it to be understood that we do not confine ourselves to such use; and, furthermore, we desire it to be understood that in lieu of the spring $c^3$ for moving the clutch-dog just before, or as, or after the said rotating member has ceased to move it we may employ any other suitable motive power, which may be released at the proper time to accomplish the desired result; and, furthermore, we desire it to be understood that any other suitable prop or support, instead of the toggle shown, may be employed for holding the latch and come within the scope of our invention.

We claim—

1. The clutch mechanism herein described, comprising, in combination, the following elements, viz: a rotating member loose on a shaft and having one or more recesses, as $d$, a longitudinally-movable spring-controlled clutch-dog $e^2$, supported by the shaft and adapted to be moved by the spring into the recess $d$, said clutch-dog having a recess $e^6$ with an inclined side wall $e^7$, the bevel-ended latch $a$, normally held in said recess $e^6$ to restrain the dog from entering the recess $d$, the toggle $a^2$ $a^3$ for said latch, and means for moving the members thereof to move the latch into normal position to release the dog, substantially as described.

2. In a clutch mechanism, a rotating member loose on the shaft and having one or more recesses $d$ in its hub, a longitudinally-movable spring-controlled clutch-dog $e^2$, supported on the shaft and adapted to be moved by the spring into the recess $d$, and means, including a latch, for withdrawing said clutch-dog from said recess when actuated by the rotating member, combined with a spring for moving said latch longitudinally, and thereby the clutch-dog, as the rotating member ceases to move it, substantially as described.

3. In a clutch mechanism, a rotating member loose on the shaft and having one or more recesses $d$ in its hub, a longitudinally-movable spring-controlled clutch-dog $e^2$, supported on the shaft and adapted to be moved by the spring into the recess $d$, and means, including a latch, normally engaging with and for withdrawing said clutch-dog from said recess when actuated by the rotating member, combined with a spring operated by said rotating member to store up energy, which is released to give the clutch-dog an additional movement as the rotating member ceases to move it, and connections between said spring and rotating member, substantially as described.

4. In a clutch mechanism, a rotating member loose on the shaft, having one or more recesses $d$ in its hub, a longitudinally-movable spring-controlled clutch-dog $e^2$, supported by the shaft and adapted to be moved to enter the recess $d$, combined with a longitudinally-movable latch for withdrawing said clutch-dog from the recess when the latter is actuated by the rotating member, and a spring actuated by said latch when moved at such time in one direction to store up energy and which is thereafter released to move the latch in the opposite direction and thereby further move the clutch-dog from engagement with the rotating member, substantially as described.

5. In a clutch mechanism, a rotating member loose on the shaft, having one or more recesses $d$ in its hub, a longitudinally-movable spring-controlled clutch-dog $e^2$, supported by the shaft and adapted to be moved by the spring into the recess $d$, said clutch-dog having a recess $e^6$, with an inclined side wall $e^7$, combined with the bevel-ended latch $a$, adapted to enter said recess $e^6$ and to withdraw the dog from the recess $d$ as the inclined portion of said dog is brought to bear against the beveled end of the latch by the action of the rotating member, means for raising and lowering said latch to thereby bring it into and out of position to engage the clutch-dog, a slot $a^{10}$ in said latch, which receives the pivot $a'$, thereby permitting longitudinal movement of the latch, and a spring which is operated by the longitudinal movement of the latch in one direction to store up energy, and which when released moves said latch in the opposite direction to further move the clutch-dog as the rotating member ceases to move it, substantially as described.

6. In a clutch mechanism, a rotating member loose on the shaft and having one or more recesses $d$ in its hub, a longitudinally-movable spring-controlled dog $e^2$, supported on the shaft and adapted to be moved by the spring into the recess $d$, and a latch normally in engagement with and for withdrawing said clutch-dog, combined with a prop or latch-support for said latch to retain it in normal position, and a treadle and treadle-rod connected to said prop or latch-support to move it, and thereby the latch, into abnormal position out of engagement with the clutch-dog, substantially as described.

In testimony whereof we have signed our names to this specification in the presence of two subscribing witnesses.

GEORGE H. EATON.
EARL E. BARBER.

Witnesses:
  BERNICE J. NOYES,
  EDWARD F. ALLEN.